(12) United States Patent
Takamiya et al.

(10) Patent No.: US 6,990,599 B2
(45) Date of Patent: Jan. 24, 2006

(54) METHOD AND APPARATUS OF CLOCK CONTROL ASSOCIATED WITH READ LATENCY FOR A CARD DEVICE

(75) Inventors: Takeshi Takamiya, Hamura (JP); Yasunori Maki, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 529 days.

(21) Appl. No.: 10/231,245

(22) Filed: Aug. 30, 2002

(65) Prior Publication Data

US 2003/0046599 A1 Mar. 6, 2003

(30) Foreign Application Priority Data

Aug. 31, 2001 (JP) ............................. 2001-264345

(51) Int. Cl.
*G06F 1/04* (2006.01)
(52) U.S. Cl. ...................................... 713/600; 713/500
(58) Field of Classification Search ................ 713/500, 713/600
See application file for complete search history.

(56) References Cited

U.S. PATENT DOCUMENTS

| | | | | |
|---|---|---|---|---|
| 4,648,030 A | * | 3/1987 | Bomba et al. ............... | 711/141 |
| 5,247,164 A | | 9/1993 | Takahashi | |
| 5,748,971 A | | 5/1998 | Choi et al. | |
| 5,812,762 A | * | 9/1998 | Kim ............................ | 713/200 |
| 5,850,541 A | | 12/1998 | Sugimoto | |
| 5,852,767 A | * | 12/1998 | Sugita ......................... | 455/63.1 |
| 6,115,823 A | | 9/2000 | Velasco et al. | |
| 6,337,833 B1 | * | 1/2002 | Kanazashi et al. ........... | 365/233 |
| 6,775,718 B2 | * | 8/2004 | Saruwatari et al. ............ | 710/25 |
| 6,820,148 B1 | * | 11/2004 | Cedar et al. ................. | 710/104 |
| 2001/0009536 A1 | | 7/2001 | Shin | |

FOREIGN PATENT DOCUMENTS

| | | |
|---|---|---|
| JP | 08-147161 | 6/1996 |
| JP | 9-97128 | 4/1997 |
| JP | 9-204769 | 8/1997 |
| JP | 2000-251464 | 9/2000 |
| JP | 2001-14441 | 1/2001 |
| JP | 2001-184304 | 7/2001 |

* cited by examiner

*Primary Examiner*—A. Elamin
*Assistant Examiner*—Tse Chen
(74) *Attorney, Agent, or Firm*—Finnegan, Henderson, Farabow, Garrett, Dunner, L.L.P.

(57) ABSTRACT

An SD memory card host controller supplies a clock to an SD memory card and issues a read command. After that, the host controller stops supplying the clock to the SD memory card during latency of read data from receipt of a response to the read command from the SD memory card to readout of data. The host controller resumes supplying the clock immediately before a data cycle starts. Power savings can thus be achieved by controlling the clock to be supplied to the SD memory card.

6 Claims, 6 Drawing Sheets

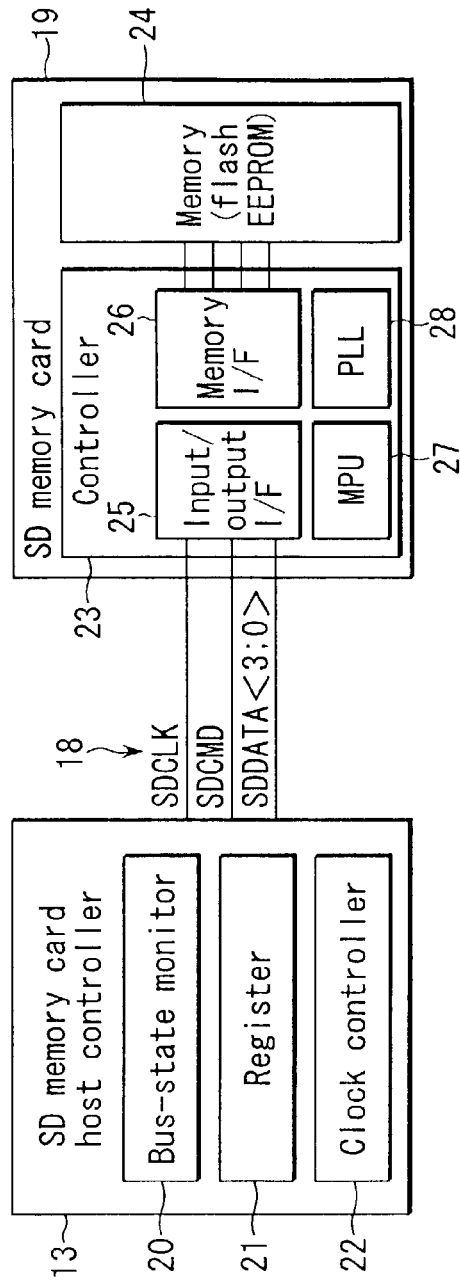
F I G. 2
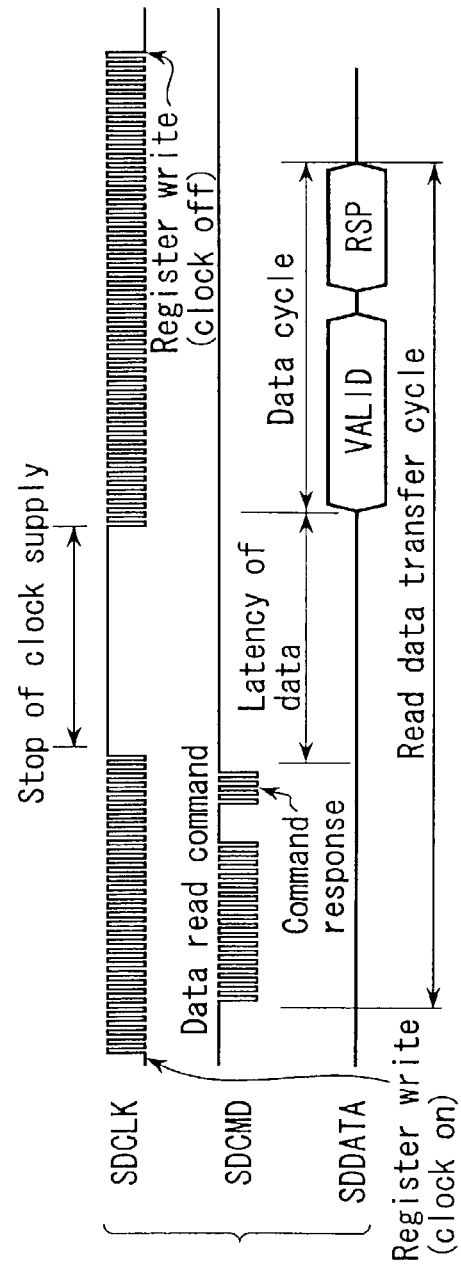
F I G. 3

METHOD AND APPARATUS OF CLOCK CONTROL ASSOCIATED WITH READ LATENCY FOR A CARD DEVICE

CROSS-REFERENCE TO RELATED APPLICATIONS

This application is based upon and claims the benefit of priority from the prior Japanese Patent Application No. 2001-264356, filed Aug. 31, 2001, the entire contents of which are incorporated herein by reference.

BACKGROUND OF THE INVENTION

1. Field of the Invention

The present invention relates to an apparatus for controlling a card device and a clock control method.

2. Description of the Related Art

Electronic equipment such as a personal computer, a PDA, a cellular phone, and a digital camera often employs a removable storage device. Recently an SD memory card has frequently been used as a removable storage device. The SD memory card includes a flash memory and meets the demand for miniaturization, high-speed data processing, optimization of storage capacity, etc.

Electronic equipment mounted with an SD memory card includes an SD memory card host controller (referred to as a host controller hereinafter) for controlling the SD memory card. The host controller supplies a clock to the SD memory card via an SD bus to communicate with the SD memory card.

In order to reduce power consumption, the host controller usually stops supplying a clock to the SD memory card when no access is gained to the SD memory card and no SD memory card is inserted. The host controller supplies a clock to the SD memory card when access to the SD memory card is required. This control is performed using a register included in the host controller.

The host controller writes data indicative of clock-on to an internal register to supply a clock (SDCLK) to the SD memory card and issue a read command. Then, a response (command response) to the read command is returned from the SD memory card. Latency (several tens of microseconds) of read data elapses from the receipt of the response to the start of data transfer (data cycle). After the data cycle has completed, the host controller writes data indicative of clock-off to the internal register to stop supplying the clock (SDCLK) to the SD memory card.

The SD memory card includes a PLL (phase locked loop) circuit. It can therefore perform a read operation without any trouble even when no clock is supplied from the SD bus during the above latency. Power consumption will therefore be wasted if a clock is supplied to the SD memory card during the latency.

Jpn. Pat. Appln. KOKAI Publication No. 9-204769 discloses a method of reducing power consumption of a memory card. However, it does not disclose reducing any power consumption on the host controller side.

Jpn. Pat. Appln. KOKAI Publication No. 2000-251464 discloses a method of selectively using one from among different clocks. However, it does not disclose stopping the supply of a clock during the latency of read data.

BRIEF SUMMARY OF THE INVENTION

Accordingly, it is an object of the present invention to provide a controller that achieves power savings by controlling a clock supplied to a card device and a clock control method.

According to one aspect of the present invention, there is provided an apparatus for controlling a card device, comprising a clock generator which generates a clock to be supplied to the card device; a command generator which issues a read command to the card device; and a clock controller which stops supply of the clock to the card device during latency of read data from receipt of a response to the read command from the card device to readout of data.

According to another aspect of the present invention, there is provided an apparatus for controlling a card device, comprising a clock generator which generates a clock to be supplied to the card device; a command generator which issues a read command to the card device; and a clock controller which partially eliminates the clock and supplies the partially-eliminated clock to the card device during latency of read data from receipt of a response to the read command from the card device to readout of data.

According to still another aspect of the present invention, there is provided an apparatus for controlling a card device, comprising a clock generator which generates a clock to be supplied to the card device; a command generator which issues a read command to the card device; and a clock controller which supplies the clock to the card device by varying a frequency thereof during latency of read data from receipt of a response to the read command from the card device to readout of data.

According to still another aspect of the present invention, there is provided a clock control method comprising supplying a clock to a card device; issuing a read command to the card device; and stopping supply of the clock to the card device during latency of read data from receipt of a response to the read command from the card device to readout of data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing in detail a relationship in connection between a host controller and an SD memory card;

FIG. 3 is a timing chart showing a clock control operation in data read processing;

DETAILED DESCRIPTION OF THE INVENTION

An embodiment of the present invention will now be described with reference to the accompanying drawings.

Figure 1:
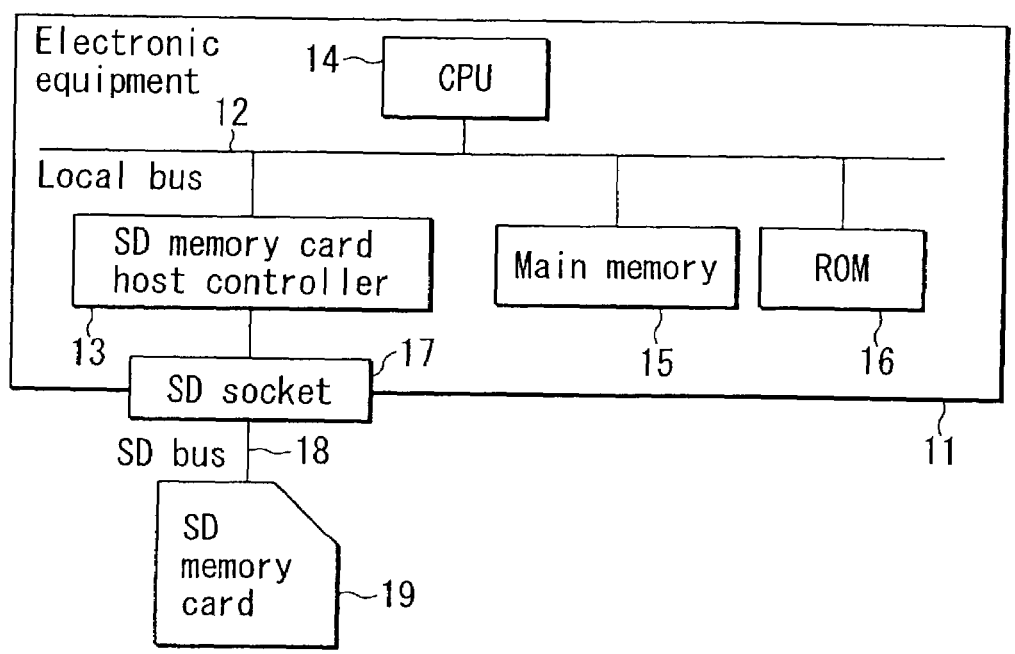
FIG. 1 is a block diagram showing a configuration of a system including an SD memory card host controller according to an embodiment of the present invention.

FIG. 1 is a block diagram showing a configuration of a system including an SD memory card host controller according to the embodiment of the present invention.

Electronic equipment 11 such as a card reader includes a local bus 12, an SD memory card host controller (referred to as a host controller hereinafter) 13 connected to the local bus 12, a CPU 14, a main memory 15, and a ROM 16. The electronic equipment 11 also includes an SD socket 17 connected to the host controller 13. An SD memory card 19 is connected detachably and electrically to the SD socket 17 via an SD bus 18.

The local bus 12 transfers data and the like among the host controller 13, CPU 14, main memory 15 and ROM 16.

The host controller 13 complies with the SD memory card host controller standards and operates as a host of the SD memory card 19 to control the SD memory card 19 through the SD bus 18.

The CPU 14 controls the entire operation of the electronic equipment 11. For example, the CPU 14 loads a control program into the main memory 15 from the ROM 16 to execute the program and issues a command to set a process of performing a clock control operation of the SD memory card in the host controller 13.

The main memory 15 provides the CPU 14 with a work area. For example, the memory 15 stores a command to be executed by the CPU 14 and serves as a buffer for temporarily storing data of the SD memory card 19.

The ROM 16 stores various programs and data. For example, it stores a command to be executed by the CPU 14.

The SD socket 17 is used exclusively for connecting the SD memory card 19 and the host controller 13 to each other. For example, it is provided on the side of the electronic equipment 11.

The SD memory card 19 complies with the SD memory card standards and includes a flash memory. The card 19 reads/writes data under the control of the host controller 13.

FIG. 2 is a block diagram showing in detail a relationship in connection between the host controller 13 and SD memory card 19.

The SD bus 18 that connects the host controller 13 and the SD memory card 19 includes one signal line for clocks (SDCLK), one signal line for commands (SDCMD), and four signal lines for data (SDDATA).

The clock signal line is one for supplying a clock to the SD memory card 19 from the host controller 13. The command signal line is one for sending a read/write command to the SD memory card 19 from the host controller 13 or returning a response to the command. The data signal line is one for transferring data corresponding to a read/write command between the host controller 13 and the SD memory card 19.

The host controller 13 includes a bus-state monitor (monitor circuit) 20, a register 21, and a clock controller 22.

The bus-state monitor 20 monitors a state of the SD bus 18. For example, it can detect a response to a read command on the SD bus 18.

The register 21 contains a plurality of bits indicating various states, especially a bit (read command response state bit) indicating whether a response to the read command is given or not. The contents of the bits of the register 21 are updated by writing software.

The clock controller 22 stops a clock from being supplied to the SD memory card 19 during the latency of read data from the receipt of a response to the read command from the SD memory card 19 to the readout of data. Instead of stopping the supply of clocks, the clocks can be partially eliminated and supplied or they can be supplied by varying in frequency (cycle).

The SD memory card 19 includes a controller 23 and a memory 24.

The controller 23 reads/writes or transfers data in response to a command issued from the host controller 13 based on the clock supplied from the host controller 13. The memory 24 includes a flash EEPROM to/from which data is written/read under the control of the controller 23.

The controller 23 includes an input/output interface 25, a memory interface 26, an MPU 27, and a PLL circuit 28.

The input/output interface 25 interfaces with the host controller 13 and operates in synchronization with a clock supplied from the host controller 13. The memory interface 26 interfaces with the memory 24 to read/write/erase data from/to/from the memory 24.

The MPU 27 is a processor that controls the entire operation of the controller 23 to control the input/output interface 25, memory interface 26, and PLL circuit 28. The PLL circuit 28 multiplies a clock from an internal oscillator using PLL and generates an internal clock. A data read operation continues in response to the internal clock during the latency of read data.

FIG. 3 is a timing chart showing a clock control operation in data read processing.

The host controller 13 write data indicative of clock-on to the register 21 to supply a clock (SDCLK) to the SD memory card 19 and issue a read command. Then, the host controller receives a response (command response) to the read command from the SD memory card 19.

Latency (several tens of microseconds) of read data elapses from the receipt of the response to the start of data transfer (data cycle). The SD memory card 19 requires no clock (SDCLK) during the latency. In this embodiment, therefore, the host controller stops the supply of a clock (SDCLK) immediately after it receives a response to the read command and resumes supplying the clock (SDCLK) immediately before the transfer of data (data cycle) is actually started.

After the data cycle has completed, the host controller 13 write data indicative of clock-off to the register 21 to stop supplying the clock (SDCLK) to the SD memory card 19.

Figure 4:
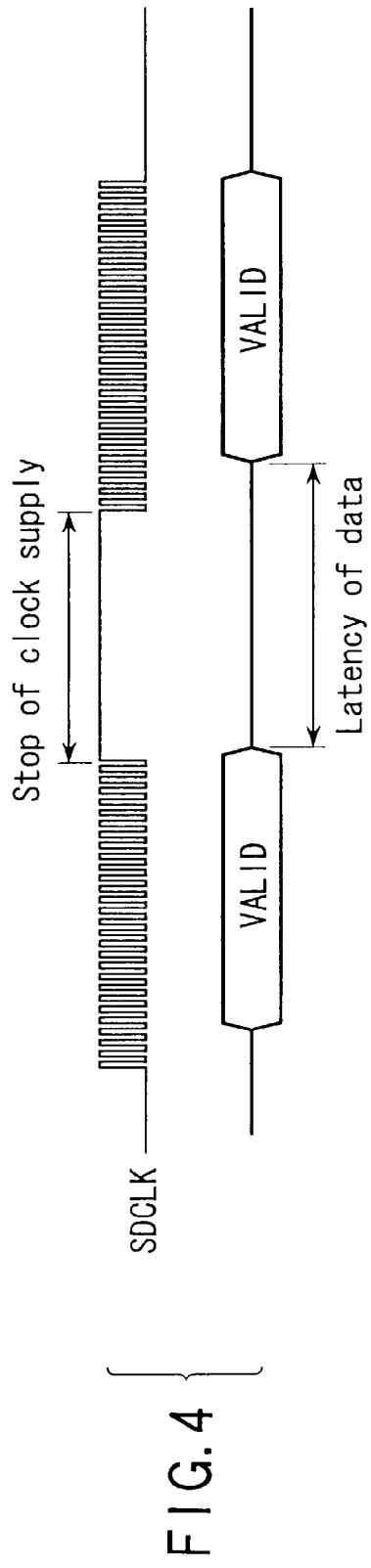
FIG. 4 is a timing chart showing a clock control operation performed at the time of multi-block transfer of data.

The state in which the SD memory card 19 requires no clock (SDCLK) is not limited to the above latency of read data but occurs even during the latency of multi-block transfer of data. Thus, the clock controller 22 can stop supplying a clock during the latency of data when data is under multi-block transfer from one block to another block as shown in FIG. 4.

Figure 5:
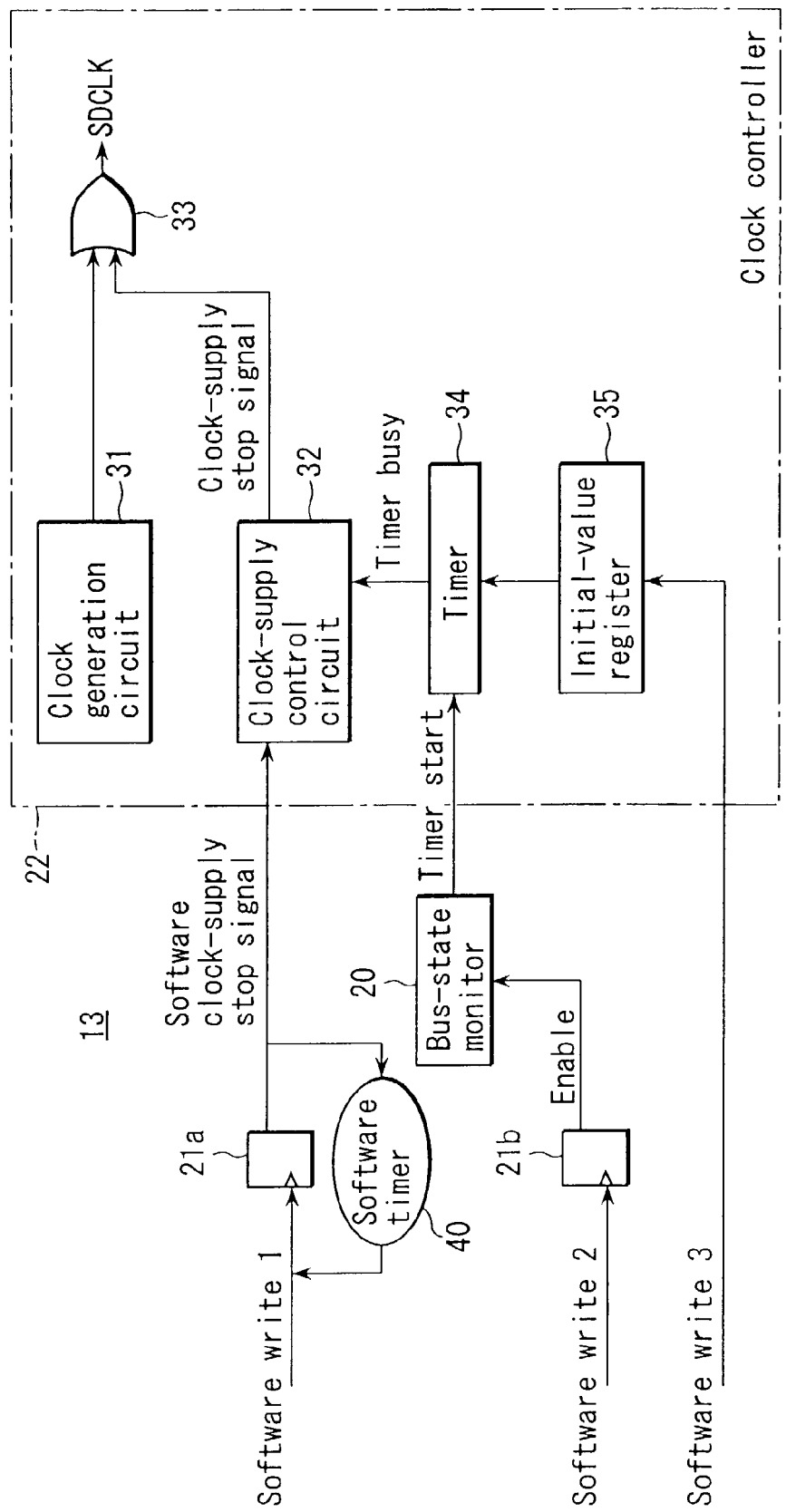
FIG. 5 is a block diagram chiefly showing a structure of a clock controller included in the host controller.

FIG. 5 is a block diagram chiefly showing a structure of the clock controller 22 included in the host controller 13.

A clock generation circuit 31 is a circuit that generates a clock to be supplied to the SD bus.

A clock-supply stop control circuit 32 is a circuit that receives a software clock-supply stop signal and a timer busy signal and transmits a clock-supply stop signal to a gate circuit 33. The software clock-supply stop signal is supplied when software write 1 is made to a register 21a. When a software clock-supply stop signal is generated, a software timer 40 starts to measure time. After a given period of time elapses, software for releasing a clock-supply stop is written to the register 21a.

The gate circuit 33 is a circuit that stops supplying a clock to the SD memory card 19 from the clock generation circuit 31 when an input clock-supply stop signal is enabled.

A hardware timer 34 decrements from the initial value in response to a timer start signal and then asserts a busy signal to the clock-supply stop control circuit 32. The timer start signal is supplied when the bus-state monitor 20 detects a response to a read command on the SD bus 18. The monitor 20 is enabled in response to a hardware timer enable signal when software write 2 is made to the register 21b.

An initial-value register 35 stores an initial value and sets it in the timer 34 when software write 3 is made to the register 35.

The following two methods are adopted in order to stop supplying a clock in the clock controller shown in FIG. 5.

A first clock-supply stop method is as follows. Upon receiving a response to a read command, the host controller makes software write 1 to the register 21a and measures a time period for which the supply of a clock is to be stopped, upon data writing to the register 21a using the software timer 40. Of the components shown in FIG. 5, the register 21a, software timer 40, clock-supply stop control circuit 32, clock generation circuit 31, and gate circuit 33 are used in the first method.

A second clock-supply stop method is as follows. When the bus-state monitor 20 monitors a state of the SD bus 18 and detects a response to a read command, the hardware timer 34 measures a time period for which the supply of a clock is to be stopped. Of the components of the clock controller shown in FIG. 5, the register 21b, hardware timer 34, initial-value register 35, clock-supply stop control circuit 32, clock generation circuit 31, and gate circuit 33 are used in the second method.

Figure 6:
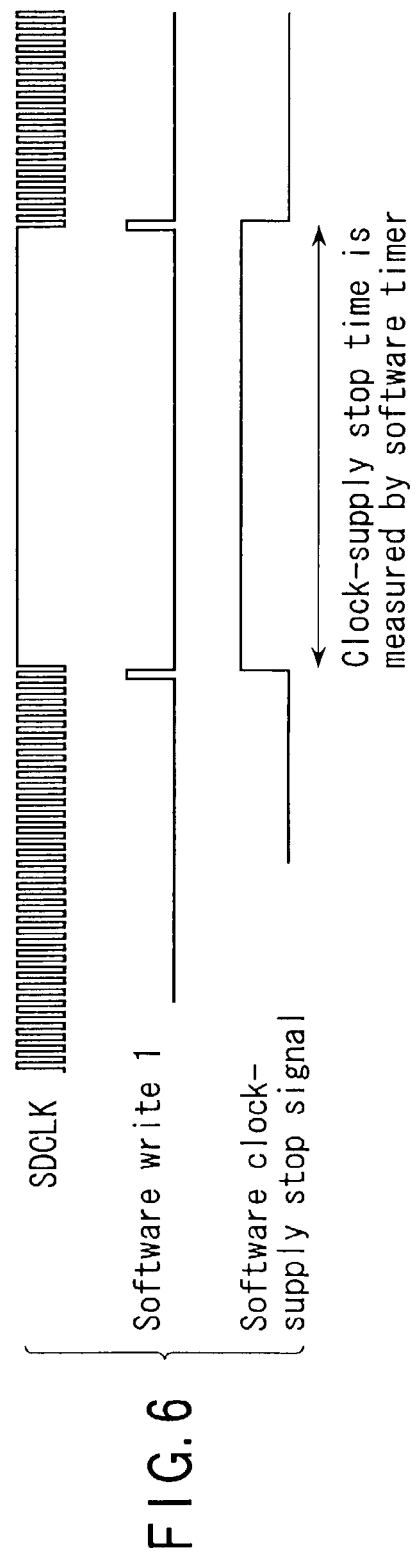
FIG. 6 is a timing chart showing an operation according to a first clock-supply stop method.

FIG. 6 is a timing chart showing an operation according to the first clock-supply stop method.

A clock (SDCLK) generated from the clock generation circuit 31 passes through the gate circuit 33 and is supplied to the SD memory card 19.

Referring to a read command response state bit of the register 21, the host controller checks whether to receive a response to a read command using software. When the host controller receives the response, it makes software write 1 to the register 21a. A software clock-supply stop signal is thus enabled and the supply of a clock is stopped through the clock-supply stop control circuit. Concurrently with this, the software timer 40 measures a time period for which the supply is to be stopped.

After the measurement of the time period has completed, the host controller writes software for releasing a clock-supply stop to the register 21a. A software clock-supply stop signal is thus disabled and the supply of a clock is resumed through the clock-supply stop control circuit.

Figure 7:
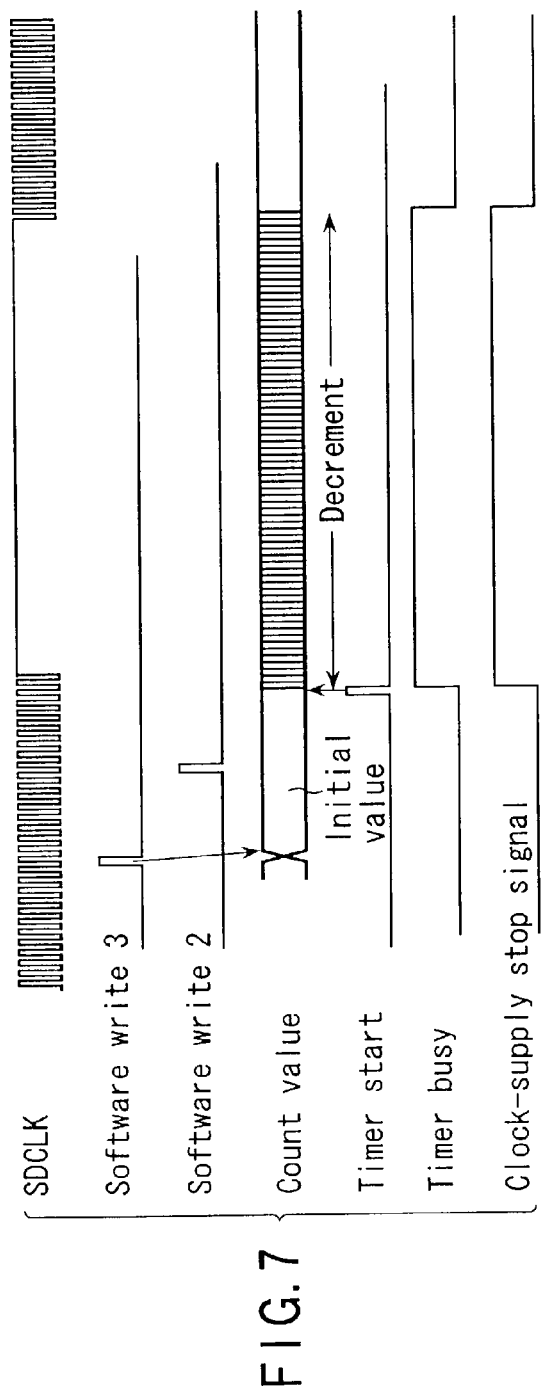
FIG. 7 is a timing chart showing an operation according to a second clock-supply stop method.

FIG. 7 is a timing chart showing an operation according to the second clock-supply stop method.

A clock (SDCLK) generated from the clock generation circuit 31 passes through the gate circuit 33 and is supplied to the SD memory card 19.

An initial value of the hardware timer 34 is set in advance in the initial-value register 35 by software write 3.

An enable signal generated by software write 2 enables the bus-state monitor 20. When the monitor 20 monitors the SD bus 18 and detects a response to a read command on the SD bus 18, it generates a timer start signal.

Upon receiving the timer start signal, the timer 34 starts to decrement and asserts a busy signal to the clock-supply stop control circuit 32 during the decrement. The supply of a clock is therefore stopped.

After the timer 34 completes measuring a time period for which the supply of a clock is to be stopped, it asserts a timer busy signal. Thus, a clock-supply stop signal is disabled and the supply of a clock is resumed.

Figure 8:
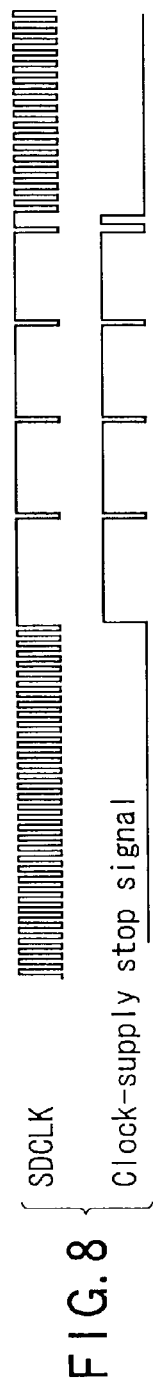
FIG. 8 is a timing chart showing an operation for deasserting a clock-supply stop signal at times.

FIG. 8 shows an example in which a clock-supply stop signal is deasserted at times to lower the frequency of a clock to an extreme. This example will be described later.

Figure 9:
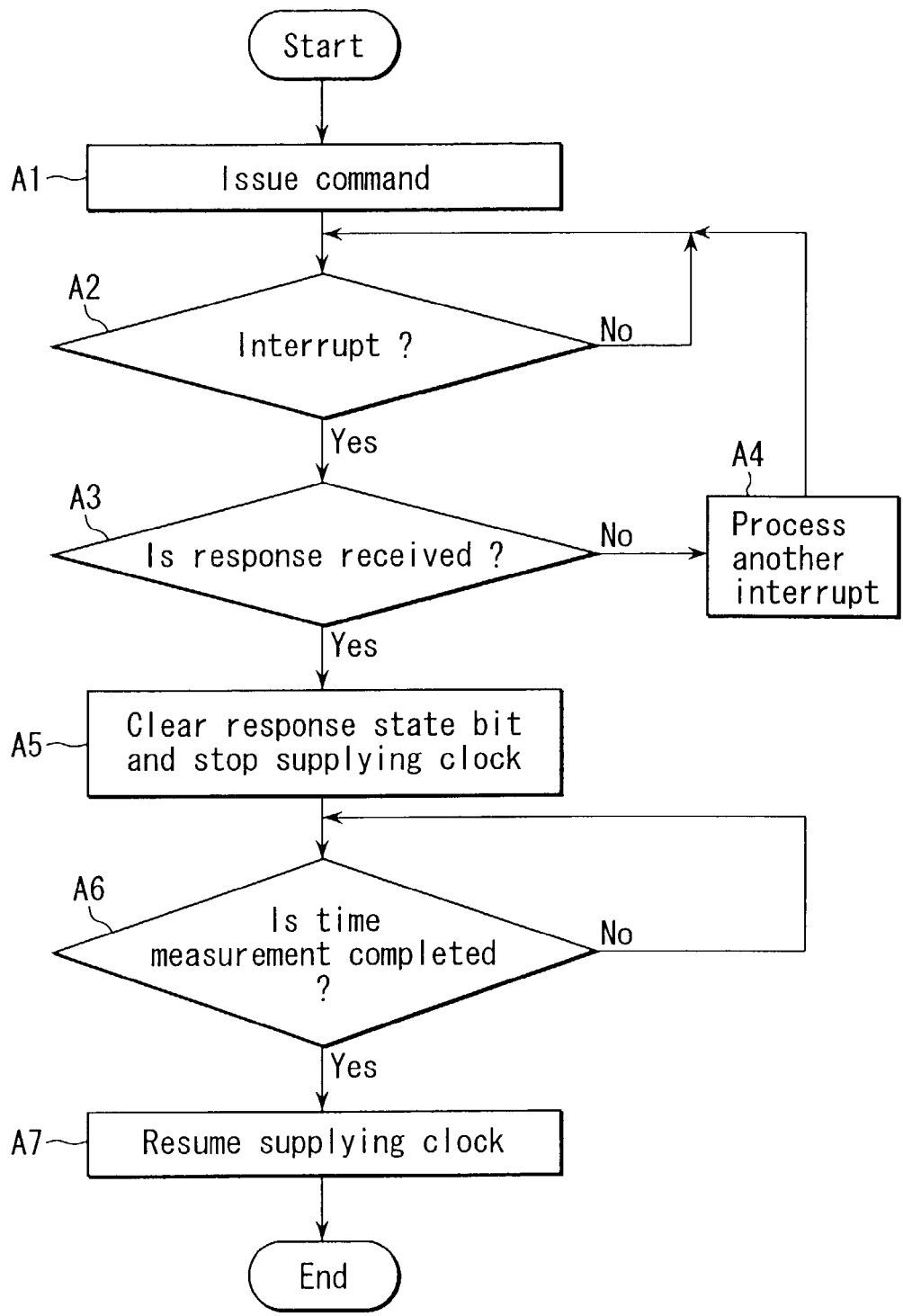
FIG. 9 is a flowchart explaining a clock control operation in data read processing.

A clock control operation in data read processing will now be described with reference to the flowchart shown in FIG. 9. The foregoing first clock-supply stop method is applied to the clock control operation.

The host controller 13 supplies a clock to the SD memory card 19 to issue a read command (step A1). After that, the host controller checks whether an interrupt has occurred or not (step A2). When an interrupt has occurred, the controller checks whether it receives a response (command response) to the read command from the SD memory card 19 with reference to a read command response state bit (step A3).

When the host controller does not receive a response to the read command, it processes another interrupt (step A4) and repeats the process from step A2.

When the host controller receives a response to the read command, it clears the read command response state bit and stops supplying a clock (step A5).

When the timer completes measuring time (step A6), the controller resumes supplying a clock (step A7).

After the data cycle has completed, the host controller 13 stops supplying a clock to the SD memory card 19.

According to the embodiment described above, power savings can be achieved by stopping supplying a clock to the SD memory card during the latency of read data from the receipt of a response to the read command from the SD memory card to the readout of data.

In the foregoing embodiment, the supply of a clock is stopped. However, power consumption can be reduced by not stopping the supply of a clock completely but deasserting a clock-supply stop signal at times to lower the frequency of the clock to an extreme as shown in FIG. 8. In other words, the clocks generated from the clock controller 22 are partially eliminated during the latency of read data without varying in basic clock frequency.

Furthermore, varying the cycle of a clock and the duty ratio can lower power consumption. For example, a method of varying the cycle of a clock generated from the clock generator 31 by sending a control signal to the clock generator 31 and a method of selectively outputting a clock whose frequency is divided by a counter can be employed.

According to the present invention described in detail above, there can be provided an SD memory card host controller that achieves power savings by controlling a clock supplied to an SD memory card and a clock control method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for controlling a card device, comprising:
   a clock generator which generates a clock signal to be supplied to the card device;
   a command generator which issues a read command to the card device;
   a bus-state monitor which monitors a state of a bus connected to the card device; and
   a clock controller which starts to measure a time period for which the supply of the clock signal is to be stopped, when the bus-state monitor detects a response to the read command, and stops the supply of the clock signal to the card device during a latency of read data from the detection of the response to the read command from the card device to readout of data.

2. The apparatus according to claim 1, wherein the clock controller sets a time period for which the supply of the clock signal is to be stopped.

3. The apparatus according to claim 1, wherein the clock controller stops the supply of the clock signal during latency of data while data is being transferred from one block to another block.

4. A clock control method comprising:
   supplying a clock signal to a card device;
   issuing a read command to the card device;
   monitoring a state of a bus connected to the card device;
   starting to measure a time period for which the supply of the clock signal is to be stopped, when a response to the read command is detected in the monitoring; and
   stopping supply of the clock signal to the card device during a latency of read data from the detection of the response to the read command from the card device to readout of data.

5. The method according to claim 4, further comprising setting a time period for which the supply of the clock signal is to be stopped.

6. The method according to claim 4, wherein the supply of the clock signal is stopped during latency of data while data is being transferred from one block to another block.

* * * * *